United States Patent [19]
Nilsson et al.

[11] Patent Number: 4,733,052
[45] Date of Patent: Mar. 22, 1988

[54] CONTACT TIP WELDING ELECTRODE

[75] Inventors: Anders Nilsson, Vretstorp; Rolf Nordqvist, Svaratå, both of Sweden

[73] Assignee: ESAB Aktiebolag, Gothenburg, Sweden

[21] Appl. No.: 829,828

[22] Filed: Feb. 14, 1986

[30] Foreign Application Priority Data

Feb. 15, 1985 [SE] Sweden .................. 8500714

[51] Int. Cl.$^4$ .............................................. B23K 9/12
[52] U.S. Cl. ............................ 219/137.61; 219/137.44
[58] Field of Search ............... 219/74, 137.42, 137.43, 219/137.44, 137.52, 137.61, 136, 137.51

[56] References Cited

U.S. PATENT DOCUMENTS

| 1,953,915 | 4/1934 | Burgett et al. | 219/136 X |
| 1,959,180 | 5/1934 | Stephens | 219/136 |
| 3,112,393 | 11/1963 | Manz et al. | 219/137.44 |
| 3,502,841 | 3/1970 | Herr | 219/137.61 |

FOREIGN PATENT DOCUMENTS 1007872  3/1983  U.S.S.R. .................. 219/137.61

OTHER PUBLICATIONS

*The American Heritage Dictionary*, 2nd College Ed., Boston: Houghton Mifflin Company, 1976, p. 1301.

*Primary Examiner*—E. A. Goldberg
*Assistant Examiner*—C. M. Sigda
*Attorney, Agent, or Firm*—Nils H. Ljungman

[57] ABSTRACT

A contact tip for supporting a consumable welding electrode and for supplying welding current thereto. The contact tip is generally rod-shaped and has a passage with a helical contact surface. The welding electrode is fed through the passage and makes electrical contact with the contact tip. Because of the helical contact surface, the passage never becomes constricted by cumulative deposits of dirt and extraneous matter from the welding electrode surface. Also, the helical contact surface, which axially extends at least one complete turn, has an unbending effect on the welding electrode, thus straightening the electrode. A distance "A" of the electrode axis from the contact tip axis may be chosen, as desired, considering the diameter of the welding electrode. Optionally, the contact tip may include a sleeve-like nozzle, to shield the contact tip from deposits of welding splatter.

18 Claims, 12 Drawing Figures

CONTACT TIP WELDING ELECTRODE

BACKGROUND OF THE INVENTION

1. Field of the Invention

The invention relates to a contact tip for a welding electrode. Such contact tips are generally used in welding devices as for example in arc welding torches. Contact tips of this kind constitute contact devices for the transfer of the welding current to the welding electrode, for example a solid wire electrode or a tubular electrode with a powder filling, as it is fed through the contact tip.

2. Description of the Prior Art

Prior art contact tips have the form of a tube, the internal diameter of which is slightly larger than the diameter of the electrode. The electrode slides during its passage through the contact tip tube against the inner wall of the tube thereby establishing the desired contact for the transfer of current from the contact tip tube to the welding electrode. Known are certain types of contact tip tubes which are slightly curved in one plane thereby improving the contact between the electrode and the tube. As a general rule, the position of the contact area of the electrode and the contact tip is not fixed. The length of the electrode between the tip of the electrode and this contact area which is passed by the welding current, varies. As a consequence, the energy supply to the welding pool fluctuates, which adversely affects the welding quality. Prior art contact tip tubes pose another problem because of surface impurities and coatings on electrodes.

There is described in the U.S. Pat. No. 3,112,393 a tubular contact nozzle with a helix-shaped passage for the electrode. Continuous electrical contact between the electrode and the inner wall of the nozzle is established throughout the length of the nozzle. The manufacture of this nozzle, which starts from a tube with small bore, is quite complicated and therefore costly.

Electrodes are often treated with a protective coating to prevent oxidation and deterioration. Morevoer, the surface of the electrode may become contaminated with dust and other deterious substances as for example abrased material from the electrode guides. These materials may constrict the narrow bore of a tubular contact nozzle and prohibit a uniform advancement of the electrode.

The contact nozzle should be an inexpensive item as it is worn out very quickly. Its service life is generally reckoned in hours.

OBJECTS OF THE INVENTION

It is the intention and general object of this invention to provide a simple and inexpensive non-tubular contact tip having an accessible contact surface.

A further object of the subject invention is to provide a contact tip which ensures a very good contact even for imperfectly straightened wire electrodes.

BRIEF DESCRIPTION OF THE DRAWINGS

The above and other objects of the subject invention will become more fully apparent as the following description is read in conjunction with the attached drawings wherein.

DESCRIPTION OF THE PREFERRED EMBODIMENTS

Figure 1:
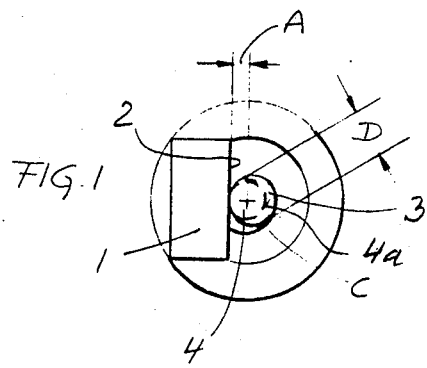
FIG. 1 shows the main features of a contact tip viewed from its front end in the direction of the axis of the tip.

The contact tip as shown in FIG. 1 consists of a bar 1 of rectangular cross-section helically wound for at least one turn about an axis C. The surface 2 closest to the axis C and the other lateral surfaces of the bar constitute helical surfaces. The axis C is situated outside the bar 1 at a distance A from the bar surface. An electrode 3 is in contact with the surface 2. Without this electrode the tip exhibits a straight cylindrical passage 4, which is indicated by a broken circle 4a with the diameter 2A. The diameter D of the wire electrode may be seen here to be greater than the diameter of the passage 4. The electrode is therefore prevailed upon as it advances through the contact tip to contact theoretically the surface 2 along the helix which is closest to the axis C. Because of the geometrical imperfections of the electrode and those of the contact tip, the electrode makes contact with the bar within a narrow, stripe-shaped contact surface on the bar which encompasses the said helix and extends axially along the bar.

The bending of the wire electrode as it is advanced along the contact tip depends partly on the situation of the axis C with respect to the bar, partly on the diameter D of the electrode, partly on the height of the pitch of the helix and last but not least on the geometrical imperfections of the contact tip and the electrode, which normally is not perfectly straight when it enters the contact tip.

It has been found that for obtaining a good contact between the electrode and the contact tip the distance A of the helix from the axis of the tip, which is also the axis of the helix, is defined by $$A \leq 0.6D$$

A positive value for A denotes that the axis C is situated outside the bar, wherein a negative value for A denotes that the axis C passes through the bar.

If $A=0.5D$ the diameter of the passage 4 is the same as the diameter D of the wire electrode. If a perfectly straight electrode enters the tip, where $0.5D \leq A \leq 0.6D$, the electrode will only incidentally slide against the contact surface of the tip. However, because of the above mentioned imperfections the distance A may be as great as 0.6D and nevertheless a good contact will normally be established. Especially thicker electrodes having a diameter of a few millimeters will properly slide against the helical contact surface. A suitable value for A can be found by tests.

A preferred range for A is $0 \leq A \leq 0.5D$. If the value of A is negative, bending of the electrode on the contact surface of the tip is quite considerable and ensures a very strong contact. It leads then to a rapid wear of the tip, especially when using thick wires. Such wear may be acceptable in certain cases, when very high demands are imposed in respect of a very low contact resistance between the welding electrode and the contact tip. If the value of A is smaller than 0.5D a good contact between the electrode and the tip is also achieved for perfectly straight electrodes.

A smoother bending of the electrode on the contact surface of the tip produces a lower contact pressure and less wear. It has been found that a contact tip which possesses optimum properties in these respects should have a distance A to which the following is applicable:

$$0.2D < A < 0.5D.$$

Lower values of A are applicable for thin electrodes and higher values for thick ones.

To extend the service life of the tip it is proposed to provide the contact surface with a layer of wear resistant, conductive material as for example nickel and nickel alloys. Such a layer can easily be deposited on the surface by electro-plating or other methods of deposition as the surface is accessible.

Another dimension of the helix which considerably affects the wear of the tip is the dimension or height of the pitch of the helix. The pitch should preferably be gripped and guided not less than 10D. The smaller the height of the pitch of the helix and the smaller the distance A, the more tightly the wire electrode will be gripped and guided curved as it passes the tip. A tighter grip on the electrode causes increased friction between the electrode and the tip. It slows down the rate of feed of the electrode and increases the rate of wear.

Further it has been found that the length of the tip should preferably correspond to at least to one complete turn of the helix about the axis. The electrode will be straightened uniformly in all directions as it passes the tip, if the length of the helix is at least one turn. A desirable straightening effect is applied to the electrode in this way such that it will leave the tip in a certain direction which for example facilitates the correct positioning of the welding torch in relation to the workpiece.

Figure 2:
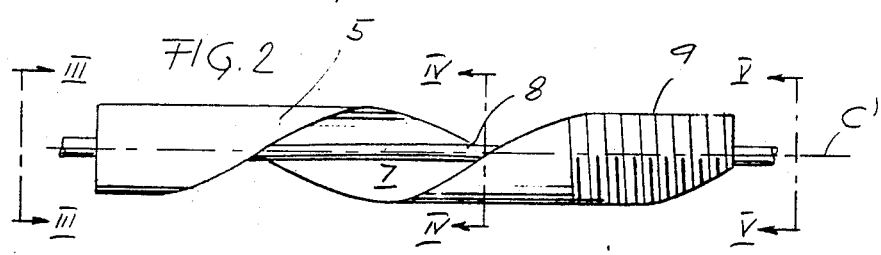
FIG. 2 shows an embodiment of a contact tip using the invention
Figure 3:
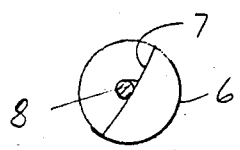
FIGS. 3, 4 and 5 are sections along III—III, IV—IV and V—V in FIG. 2.
Figure 4:
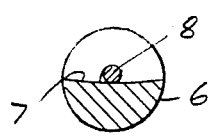
Figure 5:
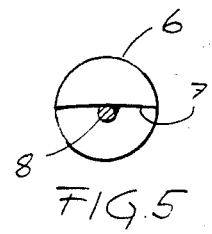

The contact tip illustrated in FIG. 2 consists of a bar 5, which is helically wound about an axis C'. The bar 5 has at least one helical opening on a circumferential side thereof. The bar has an essentially semi-cylindrical cross-section with an outer cylindrical surface 6 and a somewhat concave surface 7. A welding electrode 8 is advanced along the concave surface 7 and makes contact with it. The contact tip shown in FIG. 2 is dimensioned in such a way that the distance between the helix closest to the axis C' is greater than zero. The axis C' is therefore situated outside the bar. Moreover, this distance is also smaller than half the diameter of the electrode which is forced to adopt a helical motion as it passes the tip, as may be appreciated from FIGS. 2 to 5.

Any contaminating material which is fed to the contact tip together with the electrode falls radially out from the contact tip and will not disturb the advancement of the electrode.

Figure 6:
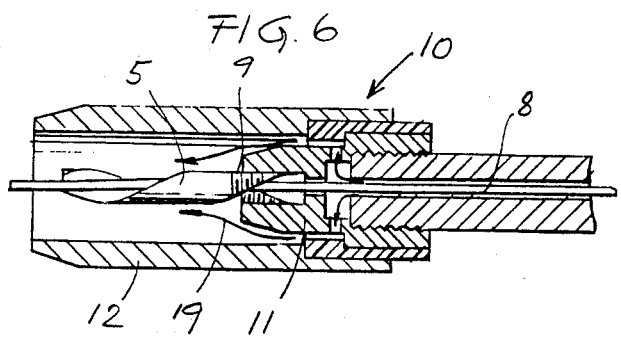
FIG. 6 shows the contact tip in accordance with FIG. 2 together with a welding torch nozzle.

The contact tip is provided at its rear end with a thread 9, which is secured in a corresponding holder 11 of a welding torch 10 with a gas nozzle 12 (FIG. 6).

Figure 7:
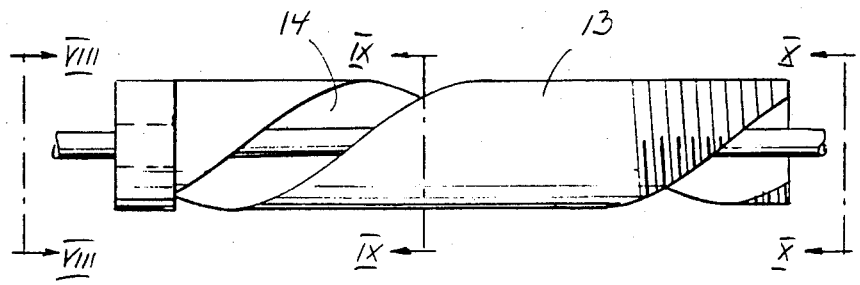
FIG. 7 shows a modified embodiment of a contact tip.
Figures 8, 9, 10:
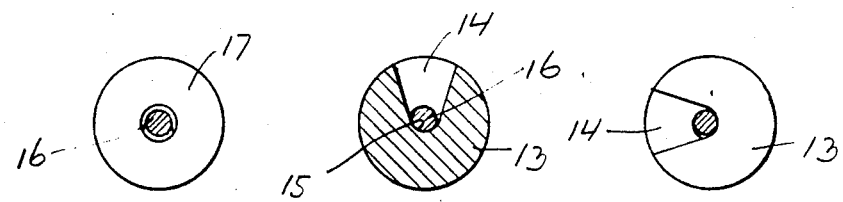
FIGS. 8, 9 and 10 are sections along VIII—VIII, IX—IX and X—X in FIG. 7.

The somewhat modified contact tip shown in of FIG. 7 has a bar 13 provided with a V-shaped helical slot 14 for an electrode 16. The slot has a rounded bottom 15 which has a radius of curvature greater than the radius of the electrode. The electrode slides against the bottom of this slot, as shown in FIGS. 9 and 10.

As a result of the very good contact between the electrode and the helical contact surface, the contact resistance is small and the heating of the contact tip is so low that spatter from the welding pool normally does not adhere on the moderately heated contact tip. However, in such cases where great spatter losses occur it is desirable to provide the contact tip at its front end with a nozzle 17 which protects the contact tip from collecting and retaining a great part of the spatter and also ensures that the electrode leaves the nozzle 17 in a certain direction.

Figure 11:
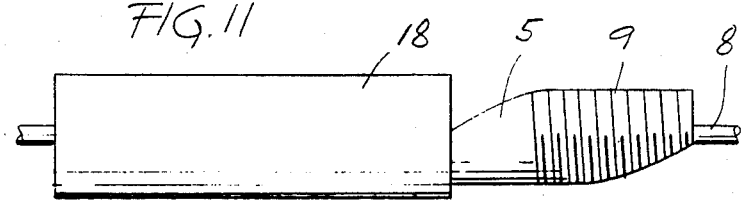
FIG. 11 shows a modified embodiment of a contact tip in accordance with FIG. 2.
Figure 12:
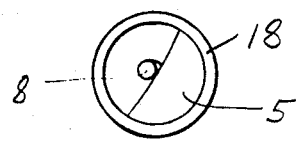
FIG. 12 shows the contact tip of FIG. 11 viewed from its front end.

The contact shown in FIGS. 11 and 12 which corresponds to the tip in FIG. 2, is surrounded by a bushing 18. In some cases the flow of a shielding gas which surrounds the contact tip—as for example shown by the arrows 19 in FIG. 6—may be disturbed by the helical surface of the contact tip and the quality of the weld might be adversely affected. As the speed of the gas flow through the nozzle of the welding torch is comparatively low, such disturbances can be normally neglected as they occur only to a small extent. The bushing should only be used if the gas flow needs to be significant and very high demands must be met. Advantageously a wear resistant layer is deposited on the contact surface before inserting the tip into the bushing.

The contact tip can be manufactured in many differet ways. What immediately comes to mind is to produce such a tip by forming by winding an originally straight bar about an axis which is situated at the distance A from the surface of the bar. Certain problems may arise, however, if the material, which is usually a hard copper alloy, can be deformed only with difficulty in this manner. It is also conceivable to manufacture these contact tips by extrusion and continuous casting processes. Further, it is also envisaged to machine a suitably bar-shaped starting material in such a way that it will be given the desired helical contact surface. For example contact tips 13 according to FIG. 7 without the nozzle can be manufactured in a similar to twist drills.

The invention as described hereinabove in the context of the preferred embodiments is not to be taken as limited to all of the provided details thereof, since modifications and variations thereof may be made without departing from the spirit and scope of the invention.

What is claimed is:

1. A contact tip for use in welding devices, said contact tip comprising a rod-shaped structure having at least one opening on a side thereof, said structure being for passing therealong and making contact with a wire electrode and for supplying welding current to said wire electrode, said structure having a passage with a helical contact surface which has a longitudinal axis, said helical contact surface making contact with said wire electrode in use for supplying welding current, and said passage having a substantially straight component along said longitudinal axis.

2. A contact tip according to claim 1, where the structure has an axis coincident with said longitudinal axis.

3. A contact tip according to claim 1, wherein said helical contact surface includes a coating of a layer of wear resistant, conductive material.

4. A contact tip according to claim 3, wherein said layer is nickel based.

5. A contact tip according to claim 1, wherein said helical contact surface has a pitch dimension which is at least 10D.

6. A contact tip according to claim 1, wherein said helical contact surface has an axial length corresponding to at least one complete helical turn of said helical contact surface about said longitudinal axis.

7. A contact tip for use in welding operation which uses a consumable welding wire of a known diameter, said tip for guiding said welding wire, making contact with and simultaneously supplying welding current to said welding wire in use, said contact tip comprising:
a substantially rod-shaped electrically conductive body having at least one passage on a side thereof, said body having a substantially helical structure formed out of a section which is substantially in the shape of a sector of a circle, said helical structure having a longitudinal axis and a passage along which said welding wire in use passes, making electrical contact with said passage;
said passage having a helical contact surface at a radial distance from said longitudinal axis of said helical structure;
said radial distance being designated as A which has a predetermined relationship with said diameter being designated as D of said welding wire defined by $$0 < A \leqq 0.6D.$$

8. A contact tip according to claim 7, where said distance A is defined by $$0.2D < A \leqq 0.6D.$$

9. A contact tip according to claim 7, where the structure has an axis coincident with said longitudinal axis.

10. A contact tip according to claim 7, wherein said helical contact surface includes a coating of a layer of wear resistant, conductive material.

11. A contact tip according to claim 10, wherein said layer is nickel based.

12. A contact tip according to claim 7, wherein said helical contact surface has a pitch dimension which is at least 10D.

13. A contact tip according to claim 7, wherein said helical contact surface has an axial length corresponding to at least one complete helical turn of said helical contact surface about said longitudinal axis.

14. A welding torch for gas shielded arc welding with a consumable wire electrode having a gas nozzle comprising:
a holder;
a contact tip secured in said holder;
said contact tip having a rod-shaped structure having at least one opening on a side thereof for passing therealong and making contact with said wire electrode and for supplying welding current to said wire electrode;
said structure having a passage with a helical contact surface which has a longitudinal axis;
said helical contact surface making contact with said wire electrode in use for supplying welding current, wherein a distance A from said helical contact surface to said longitudinal axis is defined by $$0.2 < A \leqq 0.6D,$$

wherein D is the diameter of said wire electrode; and
said contact tip exhibiting a cylindrical passage having a diameter 2A.

15. A welding torch according to claim 14, including a bushing surrounding at least a portion of the length of said contact tip.

16. A contact tip according to claim 1, wherein a distance A from said helical contact surface to said longitudinal axis is defined by $$0 < A \leqq 0.6D$$

wherein D is the diameter of the wire electrode.

17. A contact tip according to claim 16, wherein said distance A is defined by $$0.2D < A \leqq 0.6D.$$

18. A contact tip according to claim 7, wherein said contact tip exhibits a cylindrical passage having a diameter 2A.

* * * * *

UNITED STATES PATENT AND TRADEMARK OFFICE
CERTIFICATE OF CORRECTION

PATENT NO. : 4,733,052

DATED : March 22, 1988

INVENTOR(S) : Anders Nilsson and Rolf Nordqvist

It is certified that error appears in the above-identified patent and that said Letters Patent is hereby corrected as shown below:

Column 1, line 31, move "Prior art contact tip tubes pose another problem because of surface impurities and coatings on electrodes." and insert same preceding the paragraph starting on line 41.
    Column 2, line  1, move ";" to line 2, after "invention".
    Column 2, line 23, after "the", insert --bar--.
    Column 3, line 27, delete "gripped and guided".
    Column 3, line 30, after "guided", delete "curved".
    Column 3, line 35, after "least", delete "to".
    Column 4, line 14, after "contact", insert --tip--.
    Column 4, line 25, before "very", insert --if--.
    Column 4, line 41, before "similar", insert --manner--.
    Column 4, line 50, after "one", insert --helical--.
    Column 4, line 50, after "a", insert --circumferential--.
    Column 6, line 14, after "one", insert, --helical--.
    Column 6, line 14, after "a", insert --circumferential--.

Signed and Sealed this

Twenty-first Day of February, 1989

Attest:

DONALD J. QUIGG

*Attesting Officer*      *Commissioner of Patents and Trademarks*

UNITED STATES PATENT AND TRADEMARK OFFICE
CERTIFICATE OF CORRECTION

PATENT NO. : 4,733,052
DATED : March 22, 1988
INVENTOR(S) : Anders Nilsson and Rolf Nordqvist It is certified that error appears in the above-identified patent and that said Letters Patent is hereby corrected as shown below:

On the title page, Item (75), under the heading "Inventors", the city of the inventor, Rolf Nordqvist, is Svarta, instead of Svarata.

Signed and Sealed this

Twenty-third Day of May, 1989

*Attest:*

DONALD J. QUIGG

*Attesting Officer*   *Commissioner of Patents and Trademarks*